United States Patent
Kuin et al.

(10) Patent No.: US 6,807,825 B2
(45) Date of Patent: Oct. 26, 2004

(54) METHOD FOR MANUFACTURING A GLASS PANEL FOR A CATHODE RAY TUBE

(75) Inventors: Georgius Petrus Jozef Kuin, Eindhoven (NL); Hermanus Nicolaas Tuin, Best (NL); Gehardus Meintes Oosterhout, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 61 days.

(21) Appl. No.: 10/124,036

(22) Filed: Apr. 17, 2002

(65) Prior Publication Data

US 2002/0167261 A1 Nov. 14, 2002

(30) Foreign Application Priority Data

Apr. 19, 2001 (EP) .............................................. 01201418

(51) Int. Cl.⁷ .............................................. C03B 11/12
(52) U.S. Cl. ..................... 65/69; 65/69; 65/84; 65/355; 65/374.11
(58) Field of Search .............................. 65/68, 69, 84, 65/85, 103, 355, 356, 374.11, 374.12

(56) References Cited

U.S. PATENT DOCUMENTS

| | | | | | |
|---|---|---|---|---|---|
| 3,567,415 A | * | 3/1971 | Carpenter | ....................... | 65/69 |
| 4,052,189 A | * | 10/1977 | Dockerty et al. | .............. | 65/319 |
| 4,566,893 A | * | 1/1986 | Hopkins et al. | ................ | 65/69 |
| 4,871,385 A | * | 10/1989 | Lecourt et al. | ................ | 65/115 |
| 4,923,423 A | * | 5/1990 | Stockdale et al. | ............. | 445/40 |
| 5,234,484 A | * | 8/1993 | Toch et al. | .................... | 65/117 |
| 5,837,026 A | * | 11/1998 | Sugawara et al. | .............. | 65/66 |
| 5,964,916 A | * | 10/1999 | Segawa et al. | ........... | 65/374.11 |

FOREIGN PATENT DOCUMENTS

WO          01 82325 A   * 11/2001

* cited by examiner

Primary Examiner—Sean Vincent

(57) ABSTRACT

A method for manufacturing display tube includes a first stage of press-forming molten glass put in a mold using a plunger, and a second stage of cooling the formed glass after it has been taken out from the mold. After removal of the plunger the heat radiation of the inner face portion of the central panel portion is reduced.

14 Claims, 3 Drawing Sheets

METHOD FOR MANUFACTURING A GLASS PANEL FOR A CATHODE RAY TUBE

The invention relates to a method for manufacturing a glass panel for a display tube comprising a first stage of press-forming molten glass put in a mold using a plunger and a second stage of cooling the formed glass after it has been taken out from the mold.

In the known methods a glass panel is press-formed which usually takes place at very high temperatures (1000° C.–1100° C.). In this manner a glass face panel can be formed. Cathode ray tubes, for example, comprise such a glass panel.

Cathode ray tubes (CRT's) are becoming of ever more greater size, thus increasing the weight of the CRT's. Furthermore the front surface of the glass panel is becoming ever more flatter. However, increasing the flatness of the front surface of the face panel generally increases also the weight of the glass panel because the thickness of the glass panel has to be increased to ensure safety against implosion or explosion of the CRT.

There exists a great need for increase in strength of the CRT, and in particular of the glass panel, without increasing the weight. An increase in the strength of the glass panel may improve the yield.

The present invention is aimed at providing a method which enables increasing the yield of the method and/or reducing the weight of the glass panel.

To this end the method in accordance with the invention is characterized in that during a part of the first stage after pull back of the plunger the heat radiation of the inner face portions of the central panel portion is reduced to reduce a temperature gradient to the edge portions of the panel.

The invention is based on the insight that during the cooling phase after forming in the mold inhomogeneities in the stress level in the panel can occur. In order to improve the strength of (Real Flat) display panels the cooling velocity after press forming is usually increased to a such extent that a compressive stress is produced in the surface in the order of 3 to 25 Mpa. Trying to correct for the above inhomogeneities in the stress level during a final annealing stage would easily affect the necessary compressive stress (bulk stress). This reduces the yield and can seriously affect the safety of the tubes. This is in particular important for panels with an (almost) flat inner and/or outer surface such as Real Flat panels.

Because real flat panels (for instance 51RF) have a wedge, normally the North position of the panels has a tensile stress at North position when the panel is cooled down. The intention of the inventive cooling process is to minimize temperature differences between center and edge of the front of the panel. By this the tensile stress at the North position will decrease, so cracks starting at the North position will more likely propagate to the corners instead of the center; this is better for safety. The local reduction in cooling can be advantageously realized by placing a heat reflection means opposite to the central portion of the panel which heat reflection means leaves the edge portions free. What has been explained with respect to the North position (the central area of the upper long side of the panel) also holds, mutatis mutandis, with respect to the East, South, West -and corner-positions.

Reducing the heat radiation of the thinner, central portion, of the panel has been found to be an effective means to reduce temperature gradients over the panel surface. Radiation transport is responsible for 40–70% of the heat transport. Cooling with air of other portions alone is less efficient. This effect may for instance be used in practice to manufacture panels with a lower weight, or panels with a flatter front surface, or to reduce the fall-out (=percentage of panels that does not pass safety tests) or any combination of these beneficial effects.

According to a first embodiment before removing the panel from the mold, a heat reflection means is arranged in a position facing the inner portion of the central panel portion.

According to a further embodiment a heat reflection means is used which comprises at least one plate made of a material selected from the group comprising Ni, Al, Au, or Al-oxide, or a steel plate coated with such a material.

To increase the effect of the heat reflection means an edge cooling means (fluid cooling) may be arranged adjacent at least one of the edge portions of the glass panel. (The edge portions are the areas where the viewing window and the peripheral side walls of the glass panel join.) This edge cooling assist the heat reflection means in rendering the temperature distribution over the panel face more equal.

In view of the above it is in particular an aspect of the invention to provide a display panel which has a central portion which is substantially thinner than the edge portions and which presents substantially no tensile stresses in the central area of at least one of the long and short edge portions of the panel.

A manner to realize this is to take measures that during cooling down in the forming mold all panel positions pass $T_g$ substantially at the same moment. ($T_g$ is the transition temperature at which the glass changes from the viscous state to the solid state.)

It is known that the contour of the inner face of panels of the type described become distorted during the cooling of the panels immediately following the forming thereof. Heretofore, a correction of such distortion was usually accomplished by directing a stream of aeriform cooling fluid to a selected area of the panels prior to removal of the panels from their forming molds, such stream of cooling fluid causing differential cooling of the panels which apparently counteracts the causes of undesirable distortion. There may be situations that the inventive heat radiation control is not compatible with the above method of correcting contours on the press.

According to a further aspect of the invention directing a stream of cooling fluid to a selected area of the panel for correcting the inner face contour is carried out after removal from the mold, during transport (e.g. on a conveyor belt) to a next processing stage (e.g. annealing in an oven).

These and other aspects of the invention will be apparent from and elucidated with reference to the embodiments described hereinafter.

In the drawings.

The Figures are purely schematic and not drawn to scale. In particular for clarity, some dimensions are exaggerated strongly. In the Figures, like reference numerals refer to like parts, whenever possible.

Figure 1:
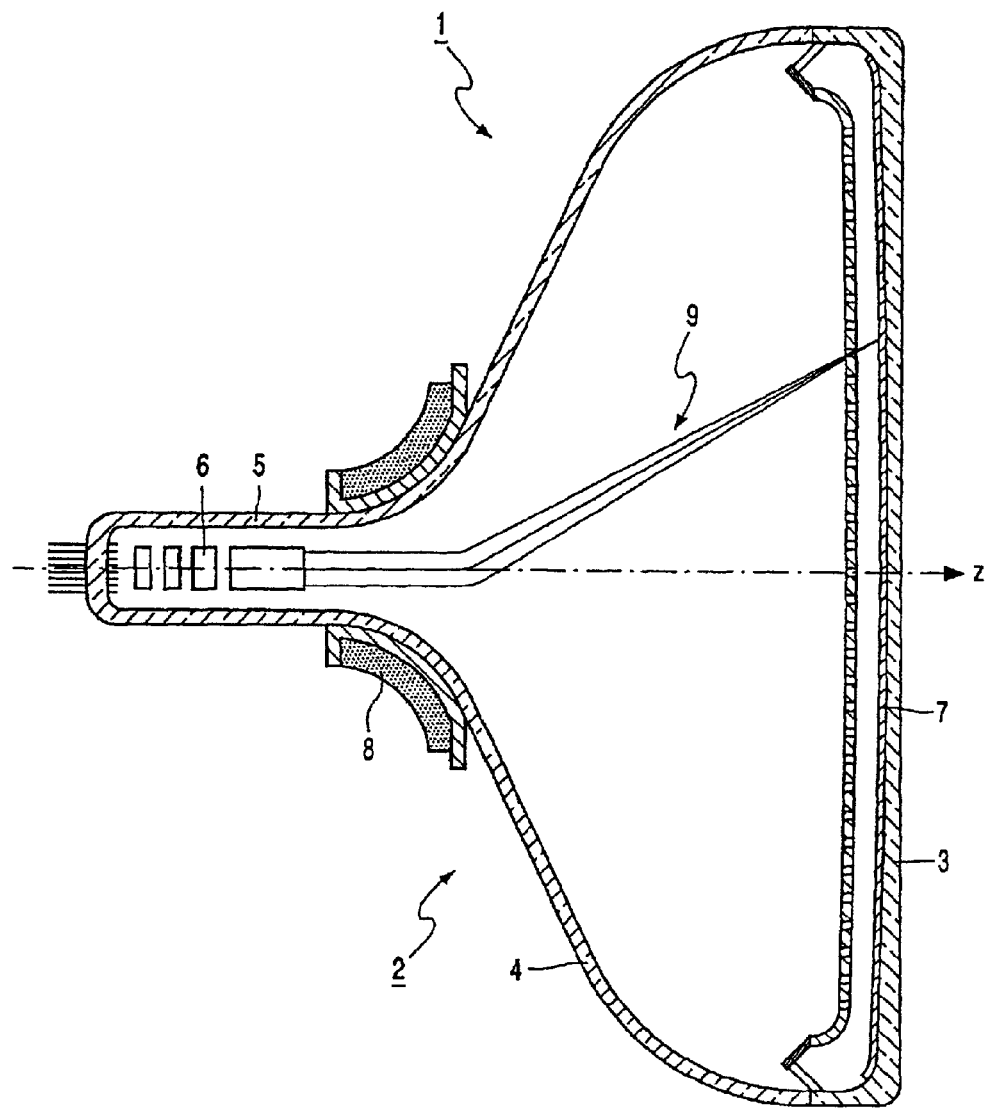
FIG. 1 is a schematic view of a cross-section of a display tube, having a press-formed glass panel.

FIG. 1 is a schematic view of a cross-section of a display tube 1 having a glass envelope 2 which includes a display panel 3, a cone 4 and a neck 5. In the neck 5, there is an electron gun for generating one or more electron beams 9.

The electron beam is focused on a phosphor layer 7 on the inner surface of the display panel 3 and deflected across the display panel 3 in two mutually perpendicular directions by means of a deflection coil system 8.

Display devices often comprise cathode ray tubes or television display tubes 1 which are entirely made of glass and are built up of two or more portions with glass walls of different thicknesses or different heat-absorption characteristics. For example, a glass television display tube 1 customarily comprises a glass display panel 3 and a glass cone 4 which are separately produced and subsequently united by fusing or using a (solder) glass fit, the joint formed being hermetically tight. The display panel 3 of such tubes is formed by a glass wall whose thickness is much greater than the wall thickness of the cone parts of such tubes. Such a greater wall thickness of the display panel 3 serves to ensure that it is sufficiently rigid when the eventual tubes comprising such a panel are evacuated.

Figure 2A:
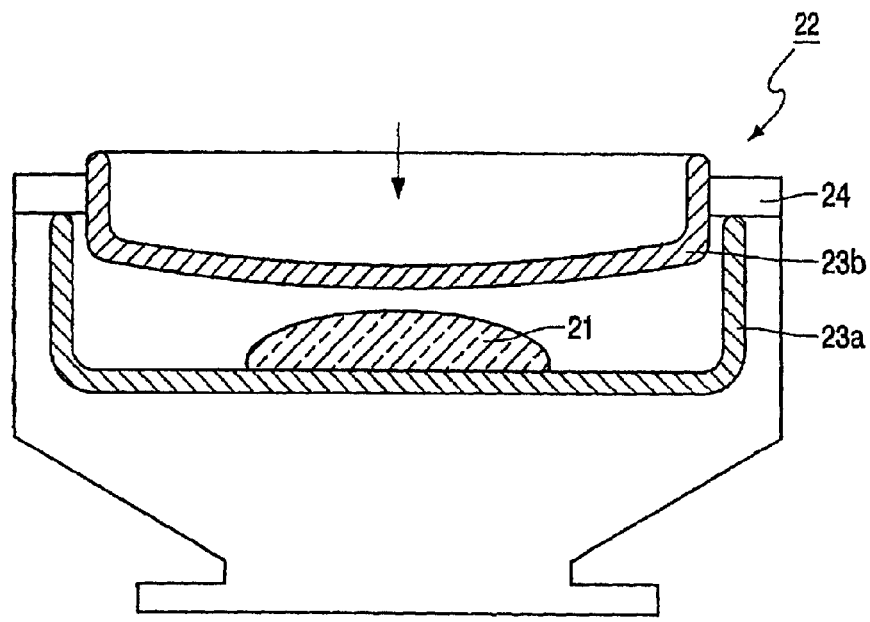
FIG. 2 illustrates the method of press-forming.
Figure 2B:
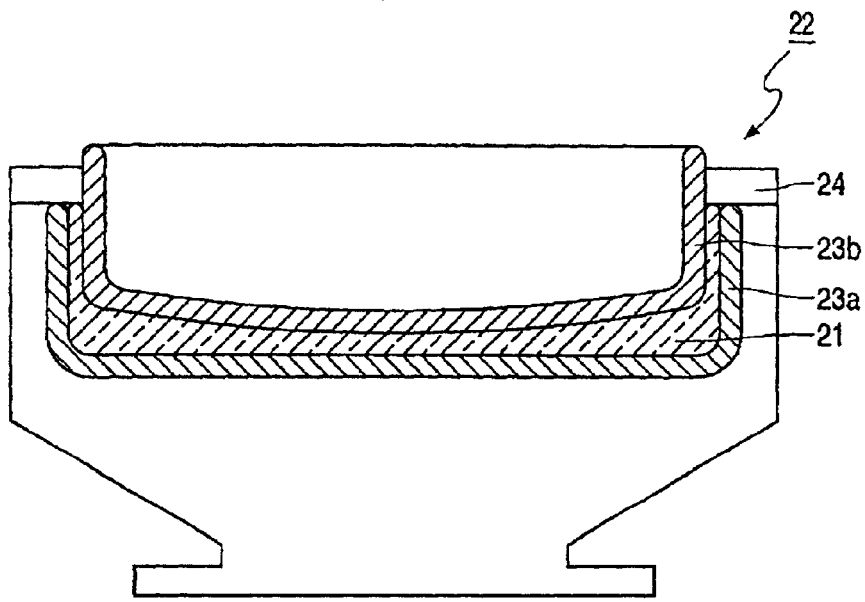
Figure 2C:
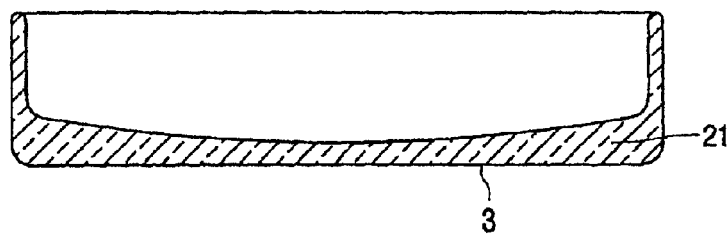

FIGS. 2A and 2B illustrate the method of press-forming. In a first method step (FIG. 2A) a glass volume 21 at a high temperature (typically 1100° C.–1000° C.) is supplied to a press 22 having a lower mould member 23a whose form corresponds to the form of the glass panel to be made and a ring member 24. A glass panel is press-formed in the usual manner by pressing a plunger 23b in the mold member 23a, with the glass volume 21 in between (FIG. 2A). The warm glass which is in contact with the relatively cold press will cause the temperature and in particular the surface temperature of the glass to drop. After formation of the glass panel 3 the plunger 23b is pulled back and the panel cools down in the mould member 23a during a certain period of time (e.g. 0,5–5 minutes) before the ring member 24 is removed and the panel 3 is taken out (FIG. 2C).

Because of the glass wedge of Real Flat (RF) panels, the center of these panel is thinner as the edge of the panel. The thinner part will normally cool down faster because of the lower heat capacity. Local temperature differences over the surface of the panel during cooling down will lead to so-called "membrane" stresses. To eliminate these stresses it is best to have an equal temperature over the surface. (Note: in the depth, because of the cooling down there is a temperature gradient, which causes the parabolic stress distribution over the thickness of the panel).

To get an equal temperature over the surface during cooling down, it is necessary to adapt the cooling to the local thickness of the glass. Cooling with heat flux Q is given by $$Q = Q_{rad} + Q_{conv} = 4\epsilon\sigma T m^3 (T_{glass} - T_{sur}) + h_{conv}(T_{glass} - T_{sur})$$

the convective part=$Q_{conv} = h_{conv}(T_{glass} - T_{sur}) = v^x(T_{glass} - T_{sur})$
the radiation part=$Q_{rad} = h_{rad}(T_{glass} - T_{sur}) = 4\epsilon\sigma T m^3(T_{glass} - T_{sur})$
v=velocity of cooling air
$\epsilon$=emission coefficient of surroundings
$T_{sur}$=temperature of surroundings
So local cooling can be adapted by:
local variation in emission coefficient $\epsilon$
local variation in velocity of cooling air v
local variation in temperature of surroundings $T_{sur}$ (local heating of surroundings)
At 500–600° C., $h_{rad}(\epsilon=1) = 4*1*56.7E-9*(550+273)^3 = 100$ [W/m²K],
so the radiative heat transfer is comparable to a strong convective heat transfer.

Figure 3:
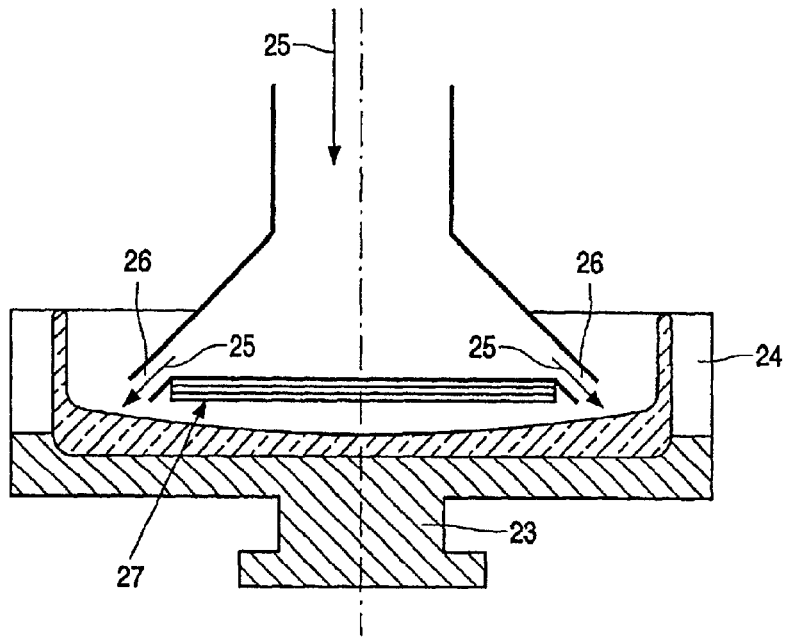
FIG. 3 illustrates the arrangement of the glass panel during a cooling step in accordance with the invention.

The radiative heat transfer can easily be changed by changing the emission coefficient, where changing the convective heat transport requires more effort. Therefore the inventions alters the local cooling of a panel by using a radiation controlling means which comprises:
a centrally located plate 27 for reflection, $\epsilon_r$=low, optionally in combination with
an edge cooling means 26, $\epsilon_a$=high.
The central portion of the panel 3 "sees" the reflection plate 27, the edges of the panel 3 "see" the cooling means 26. See FIG. 3. The edge cooling means 26 directs cooling fluid (air) 25 towards the edges of the panel 3.

A suitable reflection plate should be able to reflect radiation in the infrared region. E.g. nickel plates, aluminum plates and (polished) Al-oxide plates have been found to be suitable. The dimensions of the plate depend a.o. on the thickness of the edge portions (these may be two times thicker than the central portion) and the panel-plate distance.

Figure 4:
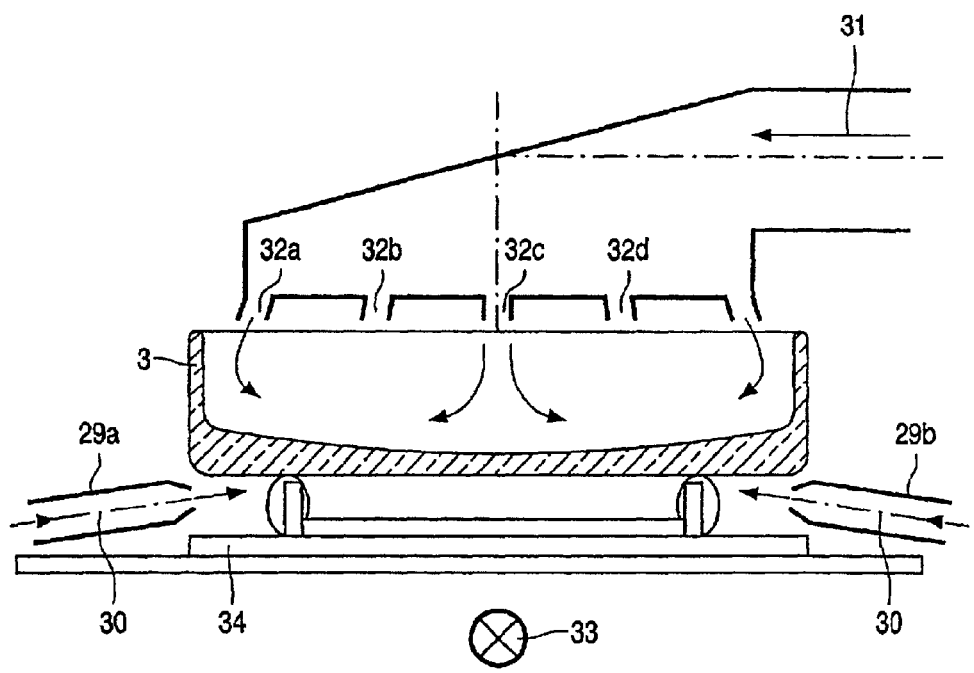
FIG. 4 shows a glass panel during transport on a conveyor belt.

As shown in FIG. 4, cooling fluid 30, 31 for correction of the inner face contour of the panel 3 can be directed onto the outer and/or the inner surface of the panel 3 during transport (in the direction indicated by the arrow 33) on a conveyor belt 34 after removal of the panel from its forming mold. An (aeriform) cooling fluid can be directed by means of nozzles 29a, 29b, or through openings 32a, 32b, 32c, 32d in a cover.

In general terms the invention relates to a method for press-forming a cathode ray tube panel, in which, before the panel is removed from the press, a heat radiation controlling means is provided at a small distance from the panel, parallel to the panel surface. Said means comprises an area with a high reflectivity for heat radiation, which first area is near the center of the panel. The result of this measure during the cooling of a panel is a more even temperature distribution over the surface of the panel. In particular, the temperature gradient between center and edges of the panel is reduced.

Because of the glass wedge of (Real) Flat panels the center of the panel is thinner than the edge of the panel. The thinner part will normally cool down faster because of the lower heat capacity. Local temperature differences over the surface of the panel during cooling down will lead to so-called 'membrane' stresses. The method of the invention will minimize these stresses.

What is claimed is:

1. A method for manufacturing a display tube, comprising a first stage of press-forming molten glass put in a mold using a plunger and a second stage of cooling the formed glass after it has been taken out from the mold, wherein after removal of the plunger the heat radiation of the inner face portion of the central panel portion is reduced.

2. A method as claimed in claim 1, wherein a heat reflection means is arranged in a position facing the inner face portion of the central panel portion.

3. A method as claimed in claim 2, wherein the heat reflection means comprises at least one plate made of a material selected from the group comprising Ni, Al, Au, Al-oxide, or a plate coated with such a material.

4. A method as claimed in claim 2, wherein simultaneously with the heat reflection means an edge cooling means is arranged adjacent at least one of the edge portions of the glass panel.

5. A method as claimed in claim 1, wherein after removal from the mold the panel is transported to a next processing stage while a steam of cooling fluid is directed to a selected area, or selected areas, of the panel.

6. A method for manufacturing a display tube, comprising:
placing molten glass in a mold
press forming the molten glass using a mold and a plunger to form a substantially flat viewing window that is joins peripheral side walls at corner regions, wherein the thickness of the glass at the corner regions is greater than the thickness of the viewing window;

removing the plunger;

reducing heat radiation from the viewing window while in the mold after the plunger is removed.

7. The method of claim 6, wherein heat radiation is reduced by locating a heat reflector adjacent the viewing window.

8. The method of claim 7, wherein the heat reflector comprises a plate.

9. The method of claim 8, wherein the plate has a surface comprised of a material selected from the group comprising Ni, Al, Au, Al-oxide, and combinations thereof.

10. A method as claimed in claim 6, further including cooling at least one corner region simultaneously with reducing heat radiation.

11. A method as claimed in claim 10, wherein cooling is performed by blowing air toward the at least one corner region.

12. A method as claimed in claim 6, wherein reducing heat radiation is performed such that the viewing window and at least one corner regions pass through the glass transition temperature contemporaneously.

13. A method as claimed in claim 6, wherein reducing heat radiation is performed such that viewing window and at least one corner region experience are formed substantially without tensile stress.

14. A method as claimed in claim 6, wherein reducing heat radiation is performed such that membrane stress is substantially eliminated.

* * * * *